United States Patent [19]

Memula

[11] Patent Number: 5,919,521

[45] Date of Patent: Jul. 6, 1999

[54] METHOD OF MARKING AN AREA WITH A DRY FOAMABLE COMPOSITION

[75] Inventor: Sadanand Memula, Missouri City, Tex.

[73] Assignee: Witco Corporation, Greenwich, Conn.

[21] Appl. No.: 09/040,790

[22] Filed: Mar. 18, 1998

Related U.S. Application Data

[63] Continuation of application No. 08/598,275, Feb. 8, 1996, Pat. No. 5,840,210.

[51] Int. Cl.$^6$ .......................... B05D 5/00; C09D 105/00; B01F 17/00
[52] U.S. Cl. .................. 427/244; 106/31.36; 106/31.38; 106/31.97; 516/14; 516/15
[58] Field of Search ............................... 252/307, 3, 354, 252/363.5, 244; 71/900, DIG. 1; 405/129; 514/945; 427/243, 244; 106/31.36, 31.38, 31.96, 31.97; 516/14, 15, 17, 18, 19

[56] References Cited

U.S. PATENT DOCUMENTS

| | | | |
|---|---|---|---|
| 3,072,580 | 1/1963 | Laiderman | 510/126 |
| 3,129,187 | 4/1964 | Meehan | 510/156 |
| 3,394,768 | 7/1968 | Chocola et al. | 252/3 |
| 3,856,772 | 12/1974 | Dunkelmann | 252/307 |
| 3,959,160 | 5/1976 | Horsler | 634/767 |
| 4,011,914 | 3/1977 | Elmer | 712/126 |
| 4,050,944 | 9/1977 | Cartwright | 252/307 |
| 4,121,664 | 10/1978 | Fischer | 166/309 |
| 4,190,428 | 2/1980 | Colton | 71/900 |
| 4,263,177 | 4/1981 | Egan | 252/307 |
| 4,439,329 | 3/1984 | Kleiner | 252/3 |
| 4,548,649 | 10/1985 | Choy | 252/3 |
| 4,597,997 | 7/1986 | Weill | 427/288 |
| 4,849,117 | 7/1989 | Bronner | 252/3 |
| 5,057,321 | 10/1991 | Edgren | 424/473 |
| 5,062,994 | 11/1991 | Impereatori | 510/141 |
| 5,156,765 | 10/1992 | Smrt | 252/307 |
| 5,158,612 | 10/1992 | Savoly | 106/678 |
| 5,196,226 | 3/1993 | Sakka | 426/564 |
| 5,215,786 | 6/1993 | Kittle | 252/307 |
| 5,279,367 | 1/1994 | Osterloh | 166/272.4 |
| 5,415,804 | 5/1995 | Minami et al. | 252/363.5 |
| 5,520,840 | 5/1996 | Massaro | 510/151 |

FOREIGN PATENT DOCUMENTS

WO9007374  7/1990  WIPO .

OTHER PUBLICATIONS

Durian, etal., "Multiple Light–Scattered Probes of Foam Structure and Dynamics" *Science* 252: 686–688 (May 1991).

*Primary Examiner*—Richard D. Lovering
*Assistant Examiner*—Daniel S. Metzmaier
*Attorney, Agent, or Firm*—Edward K. Welch, II; Andrew S. Reiskind; Timothy X. Witkowski

[57] ABSTRACT

Disclosed are dry particulate compositions containing an anionic sulfonate or sulfate surfactant, fatty mono- or di-ethanolamide, alcohol, sugar and maltodextrin. The dry compositions readily disperse in water to form formulations which can form voluminous, stable, environmentally benign foams useful, for instance, in marking outdoor areas.

10 Claims, No Drawings

5,919,521

METHOD OF MARKING AN AREA WITH A DRY FOAMABLE COMPOSITION

This application is a continuation of application Ser. No. 08/598,275 filed Feb. 8, 1996, now U.S. Pat. No. 5,840,210.

FIELD OF THE INVENTION

The present invention relates to the formation of foam by the intentional entrainment of air in a suitable aqueous composition, and more particularly to compositions of matter which when added to water form aqueous formulations which can be foamed in such means.

The present invention also relates to compositions of matter which are particularly adaptable to the formation of foams which are applied to outdoor areas, such as agricultural fields, for purposes including marking areas of the fields for any of various purposes.

BACKGROUND OF THE INVENTION

In a variety of contexts wherein work of various sorts is performed on large-scale areas, particularly outdoors, it can be desirable or necessary to be able to distinguish areas on which the work has been performed from those area on which the work has not been performed. Often, the nature of the work being performed does not change the appearance of the area sufficiently to permit making that distinction simply on the basis of observing where the work has and has not been performed.

To take a specific and common example, modern agricultural practice periodically requires applying products including (at various times) seed, various helpful agents such as herbicides, insecticides, and fungicides and so forth, and fertilizers and the like, to fields which are often very large. Application is most frequently made by tractors or other vehicles driven along the surface of the field. It is usually quite difficult to determine whether a given part of a field has or has not already received the desired application of seed, herbicide, pesticide, fungicide, fertilizer, or the like, as the case may be, simply from inspection of the soil or the plants for the presence or absence of the agent being applied. It is highly desirable to be able to differentiate those areas which have received the desired application from those areas which have not, so that the operator can be confident that all the desired areas have received the desired application, and so that the operator can avoid making application to a given area a second time which could be economically wasteful and could also be harmful to the crop and/or to the land.

Similar concerns arise in the context of applying agents of various sorts in woodlands and forests, to the soil, and/or to all or some of the trees and/or other vegetation; and to other contexts such as the application of fertilizers and/or pest control agents to grasslands (to domestic lawns, along highways, and so forth).

When it is desired to use a separate product as a marker which is applied to the soil, vegetation, crops, trees, and the like as the case may be, such a substance must exhibit an all too elusive combination of properties. On the one hand, the product used as a marker must be visible for a substantial enough period of time following its application that the operator can indeed distinguish areas or objects still in need of application from those areas or objects to which the particular application has already been made. On the other hand, the product used as a marker must eventually disperse, typically within the time period of 1–2 days, and must do so in a manner such that the product and any breakdown or dispersion byproduct thereof is benign to the environment as a whole and to the area or object to which it has been applied. In addition, such a product must itself be inexpensive as well as effective, and must require no more than minimal expense and effort when it is prepared for application and when it is applied.

Thus, there is a need in these various fields of application for a product useful as an area marker which exhibits this desired combination of properties as well as the additional properties that have been found in the product of the present invention.

BRIEF SUMMARY OF THE INVENTION

The present invention involves the discovery that compositions of matter comprising the following components

| Component | Range of Amounts |
| --- | --- |
| Anionic surfactant | 20–60 wt. % |
| Fatty acid mono ethanolamide or diethanolamide | 1–10 wt. % |
| One or more $C_{8-18}$ alcohols | 0.5–5 wt. % |
| Sugar | 10–25 wt. % |
| Maltodextrin | 10–30 wt. % | wherein the normally liquid components are completely absorbed onto the solid components and particularly to the maltodextrin, forms a dry, free-flowing composition of matter which disperses readily into water to form an aqueous formulation which forms a voluminous, stable, long-lasting foam. This foam is useful as an area marker because of the foam's high volume and stability, and because the foam and its components are benign to soil and vegetation.

The composition itself is storage stable, environmentally safe, and exhibits remarkably high dispersibility in water. It also provides foam generation with remarkably high efficiency (that is, volume of foam per unit mass of composition).

Thus, another aspect of the present invention is the method of marking an area comprising providing an aqueous dispersion of the foregoing components in the proportion indicated above, foaming the aqueous dispersion, and applying the foam to the area to be marked.

DETAILED DESCRIPTION OF THE INVENTION

The following description sets forth in broad terms and in detail, the components of the composition of the present invention; the amounts thereof; how to make the composition; and its uses and properties.

The Components

One component of the present invention is one or more anionic surfactant, preferably as the sodium salt. One preferred example is known as sodium olefin sulfonates. As is known in this art, sodium olefin sulfonates are long chain sulfonate salts prepared by sulfonation of alpha olefins, generally as one or more alpha olefins containing 6 to 20 carbon atoms. The resulting sulfonate salts include compounds exhibiting one, and more commonly both, of the following structural formulas:

Sodium $C_{14-16}$ olefin sulfonates, which are preferred, are commercially available, for instance from Witco Corporation as a product sold under the name "Witconate AOK".

Other compounds which could be used include alkyl benzene sulfonates, such as $C_8$–$C_{18}$-alkyl benzene sulfonates, a preferred example of which is sodium dodecyl benzene sulfonate (sold by Witco Corp. as "Witconate 90 Flake"). Other useful anionic surfactants include alkyl sulfates, such as $C_8$–$C_{18}$ alkyl sulfates, a preferred example of which is sodium lauryl sulfate (sold by Witco Corp. as "Witcolate A Powder"). Additional useful anionic surfactants include alcohol ether sulfates, which can be described by the general formula ($C_8$–$C_{18}$ alkyl)—(OCH$_2$CH$_2$)$_n$—OSO$_3$X in which n is 1–12 and preferably 1–4, and X is a monovalent cation which is preferably an alkali metal and more preferably sodium. Preferred examples of alcohol ether sulfates include sodium deceth sulfate and sodium laureth sulfate (sold by Witco Corp. as "Witcolate 7093" and "Witcolate LES", respectively).

Additional useful anionic surfactants include carboxylates such as salts of saturated and unsaturated fatty acids containing 8 to 20 carbon atoms. Other useful anionic surfactants are sulfosuccinates, which generally correspond to the formula

$$R^1\text{—O—C(O)—CH}_2\text{CH(SO}_3X^1\text{)—C(O)—O—}R^2$$

wherein $X^1$ is a monovalent cation, preferably ammonium or an alkali metal and more preferably sodium; and each of $R^1$ and $R^2$ is straight or branched alkyl, cycloalkyl, or cycloalkyl-alkyl, containing 6 to 18 carbon atoms, such as cyclohexyl, heptyl, hexyl, or 1-methylpentyl; or $R^1$ is $X^1$ as defined above, and $R^2$ has the formula $R^A$—(OCH$_2$CH$_2$)$_{0-12}$, $R^A$—C(O)NH—CH$_2$CH$_2$—(OCH$_2$CH$_2$)$_{0-6}$, or $R^A$—C(O)NH—(iso-C$_3$H$_6$)—(OCH$_2$CH$_2$)$_{0-6}$, wherein $R^A$ is straight or branched alkyl or alkenyl containing 8 to 20 carbon atoms and 0 to 3 carbon-carbon double bonds and is optionally substituted with hydroxyl.

Examples of useful, commercially available sulfosuccinates abound and are well known, such as dicyclohexyl sodium sulfosuccinate, disodium cocamido MEA-sulfosuccinate ("REWOPOL 1026", Witco Corp.), disodium laureth sulfosuccinate (REWOPOL SBFA 1, 3 or 30, Witco Corp.), and disodium myristamido MEA-sulfosuccinate (EMCOL 4100M, Witco Corp.).

The anionic surfactant component can generally be present in the dry composition of the present invention, in amounts ranging from about 20 wt. % to about 60 wt. % of the dry composition, and more preferably from about 30 wt. % to about 55 wt. % of the dry composition.

A second component of the compositions of the present invention is one or more monoethanolamides and/or diethanolamides of fatty acids containing 8 to 18 carbon atoms and 0 to 3 carbon-carbon double bonds. Monoethanolamides and diethanolamides generally exhibit the formula RC(O)—NHCH$_2$CH$_2$OH and RC(O)—N(CH$_2$CH$_2$OH)$_2$, respectively, wherein R is alkyl or alkenyl containing 7 to 17 carbon atoms and 0, 1, 2 or 3 carbon-carbon double bonds.

A preferred component is known as cocamide MEA, which is a mixture of ethanolamides of the mixture of fatty acids derived from coconut acid. Cocamide MEA is commercially available, such as from Witco Corporation as a product sold under the trade name "Witcamide CMEA" or "Witcamide MEAC".

The fatty acid ethanolamide component of the present invention is preferably present in the dry foaming compositions of the present invention in amounts generally ranging from about 1 wt. % to about 10 wt. % of the dry composition, and more preferably from about 2 wt. % to about 5 wt. % of the dry composition.

Other compounds that are useful as this component include lauric diethanolamide and oleic diethanolamide (sold by Witco Corp. as "Witcamide 6511", "Witcamide 6310" and "Witcamide 6546").

A third component of the composition of the present invention is one or more alcohols containing 8 to 18 carbon atoms and preferably 12 to 14 carbon atoms.

This alcohol component conforms to the formula $R^c$—OH wherein $R^c$ can be straight-chain, or branched-chain, alkyl, or alkenyl with 0, 1 or 2 carbon-carbon double bonds.

This alcohol component is preferably present in amounts ranging generally from about 0.5 wt. % to about 5 wt. % of the dry foaming composition of the present invention, and more preferably ranging from about 1 wt. % to about 3 wt. % of the dry composition.

The present invention, in one aspect, comprises mixtures of the foregoing three components, with or without one or both of the sugar and maltodextrin components described herein. The three components would thus constitute 50–97.5 wt. % of anionic surfactant, 1–35 wt. % of the fatty acid mono-and/or diethanolamide, and 0.5–20 wt. % of the alcohol. However, the preferred aspect of the invention includes both the sugar and the maltodextrin, as described herein.

A fourth component of the compositions of the present invention is one or more sugars. Useful sugars include $C_6$ and $C_{12}$ sugars, preferred examples being glucose, fructose, and sucrose. Other useful sugars include the structural isomers of glucose, fructose and sucrose. Other analogous useful sugars include sorbitol, mannitol and xylitol.

The sugar component is preferably present in the compositions of the present invention in amounts ranging from about 10 wt. % to about 25 wt. % of the dry foaming compositions of the present invention, and preferably about 15 wt. % to about 20 wt. % of the dry compositions.

A fifth component of the compositions of the present invention is maltodextrin. Maltodextrin, a commercially known product, is a saccharide obtained by hydrolysis of starch. It exhibits ease of dispersion, resistance to caking, outstanding film formation characteristics, and high solubility in water. A preferred maltodextrin is "Micropor Buds 1005-10X", sold by A.E. Staley Co.

The maltodextrin component comprises about 10 wt. % to about 30 wt. % of the dry compositions of the present invention, and more preferably comprises 15 wt. % to about 25 wt. % of the dry composition.

The composition can contain other ingredients which, while optional, may be preferred for their contributions to the properties of the composition in use. As metal ions present in the water that is used to generate the foam might interfere with formation of the foam, one may include, for instance, a sequestering agent such as sodium tripolyphosphate or sodium hexametaphosphate, or a chelating agent such as EDTA or a salt of EDTA, to complex with metal ions present in the water. In order to help provide stability to the foam after it is applied, one may include a buffering component such as a mixture of a weak acid and a salt of it or of another weak acid, or a mixture of two salts of weak acids. Examples are mixtures of NaH$_2$PO$_4$ and Na$_2$HPO$_4$; mixtures of acetic acid and sodium acetate; and mixtures of boric acid and sodium borate.

One may add a viscosity reducing agent, such as isopropanol or another liquid which does not interfere with the stability of the foam. Other optional ingredients include dye, anticaking components, hydrotropes, and inert fillers.

The Preparation

The preparation of the dry compositions of the present invention requires that the aforementioned components are combined in a manner such that the resulting product is a dry, uniform, homogeneous mixture of the indicated components. In general, the finished appearance of the dry composition is that of free flowing particulate solids.

A preferred technique is to dry blend the maltodextrin and the alcohol, whereupon the alcohol is gradually absorbed onto the maltodextrin. The other ingredients are dry blended separately, and this resulting mixture is then dry blended with the maltodextrin/alcohol blend.

Another technique is to combine all the ingredients in water, under conditions providing a non-foamed uniform dispersion, and then to spray-dry the dispersion in a conventional spray dryer.

Uses/Properties

The resulting dry composition exhibits a number of properties which represent significant advantages to the user. One of the most advantageous of these properties is the fact that the product is dry, flowable particulates or powder. Thus, the product can be used at any temperature, at any time, without needing to be heated or thawed as is often the case with liquids. There is no need to use other liquid vehicles or solvents, so the user does not need to be concerned with storage, shipment or compatibility problems that are presented by liquids. This dry product mixes readily with water, even cold water, so that even in use to prepare a foamable aqueous concentrate there is no requirement to heat the product.

The product of the present invention thus affords: rapid and complete solubilization when the solid composition is admixed with water for purposes of foam formation; higher activity, in terms of the volume of foam produced per unit amount of the dry composition; high storage stability; and lack of hazard to the environment. The dry composition is well suited for packaging in unit dose amounts in packaging including water soluble packaging materials such as polyvinyl alcohol and other water-soluble packaging materials.

In addition, the dry composition when formulated with water into a foamable liquid exhibits additional significant and useful advantages. Among these are the production of high volumes of stable, long-lasting foam. The foam, like the dry composition itself, is not hazardous to the environment. Other advantages include cold storage stability, pourability, and high efficiency in that only a relatively small amount is needed to form a high-volume foam compared to other foaming compositions.

The dry composition is typically used by admixing it with water to form an aqueous concentrate which is fed to any conventional foam-generating apparatus to generate at the orifice the desired high volume, stable foam. The aqueous concentrate, which represents another aspect of the present invention, will generally have a concentration of about 0.1 wt. % to 10 wt. % of the dry composition in the water. More preferably, the amount of dry composition comprises about 0.5 wt. % to 5 wt. % in the water, and most preferably about 1 wt. %.

The concentrate is used in any conventional foam generating apparatus. Typically, the concentrate is foamed at a volume ratio of 1 part of concentrate to about 50–80 parts of water.

The present invention is described further in the following examples, which are included for purposes of illustration and are not intended to limit the scope of that which is regarded as the invention.

EXAMPLE 1

A dry foam composition was prepared from the following ingredients

| Component | Amount (wt. %) |
|---|---|
| Sodium $C_{14-16}$ olefin sulfonates (Witconate AOK) | 52.0 |
| Cocamide MEA (Witcamide CMEA) | 3.5 |
| $C_{12-14}$ alcohol blend | 3.0 |
| 50:50 (wt. %) blend of sugar and maltodextrin | 39.5 |
| Maltodextrin | 2.0 |

The alcohol was slowly absorbed, with stirring, onto the maltodextrin to prevent gelling and to achieve a free flowing particulate solid. The remaining ingredients were then stirred together. The result was a dry product. A solution was prepared of one gram of this dry product in 99 grams of water having a maximum of 342 ppm impurities, and the foaming characteristics of the resulting aqueous formulation were compared to the foaming characteristics of two other commercial foaming products. The results are given in the following table, which compares the weight of the foam that was generated upon initial formation of the foam and at several intervals following the initial foam formation:

| Foam Weight (g) | Inventive Composition | Commercial Composition #1 | Commercial Composition #2 |
|---|---|---|---|
| at formation | 49.57 | 17.10 | 34.61 |
| 5 minutes after formation | 15.08 | 7.91 | 13.42 |
| 10 minutes after formation | 10.41 | 5.38 | 9.45 |
| 15 minutes after formation | 8.37 | 3.83 | 7.38 |
| 30 minutes after formation | 6.22 | 2.51 | 5.26 |

Thus, it can be seen that foams generated using the composition of the present invention are significantly and unexpectedly longer lasting than foams made using presently commercially available foaming compositions.

EXAMPLE 2

A dry composition was made using the following components:

| Component | Amount (wt. %) |
|---|---|
| Sodium $C_{14-16}$ olefin sulfonate (Witconate AOK) | 52.0 |
| Cocamide MEA (Witcamide CMEA) | 3.5 |
| $C_{12-14}$ alcohol | 3.0 |
| Sugar | 19.75 |
| Maltodextrin | 21.75 |

This composition was formulated in the same manner as the composition described in Example 1, resulting in a dry product. An aqueous formulation was prepared by mixing one gram of this dry product in 99 ml of 342 ppm-impurity water, and a foam was generated from this aqueous formulation using conventional foam generating equipment used in agricultural applications. The foam was applied to an outdoor gravel walkway, and to a grassy lawn, and in both cases the foam remained stable on the respective surfaces for more than two hours.

What is claimed is:

1. A method for marking an area, comprising:
   (a) forming an aqueous dispersion comprising
      (a.1) 20 to 60 wt. % based on components (a.1), (a.2), (a.3), and (a.4) of at least one anionic surfactant,
      (a.2) 1 to 10 wt. % based on components (a.1), (a.2), (a.3), and (a.4) of at least one component selected from the group consisting of fatty acid monoethanolamides and fatty acid diethanolamides,
      (a.3) 0.5 to 5 wt. % based on components (a.1), (a.2), (a.3), and (a.4) of at least one alcohol containing 8 to 18 carbon atoms, and
      (a.4) 20 to 55 wt. % based on components (a.1), (a.2), (a.3), and (a.4) of at least two sugars, one sugar of which is maltodextrin which comprises 10 to 30 wt. % based on components (a.1), (a.2), (a.3), and (a.4);
   (b) foaming the dispersion; and
   (c) applying the foam formed in step (b) to the area.

2. The method according to claim 1, wherein the anionic surfactant is selected from the group consisting of:
   $C_{6-20}$ olefin carboxylates and sulfonates;
   alkyl benzene carboxylates and sulfonates wherein the alkyl moiety contains 8 to 12 carbon atoms;
   alkyl carboxylates and sulfates wherein the alkyl moiety contains 8 to 18 carbon atoms;
   alcohol ether carboxylates and sulfates of the formula (Alk)-$(OCH_2CH_2)_n$—$SO_3X$ and (Alk)-$(OCH_2CH_2)_n$—COOH wherein (Alk) is alkyl containing 8 to 18 carbon atoms, n is 1–12, and X is a monovalent cation;
   sulfosuccinates of the formula $R^1$—O—C(O)—$CH_2$CH($SO_3X^1$)—C(O)—O—$R^2$,
   wherein $X^1$ is a cation, each of $R^1$ and $R^2$ is straight or branched alkyl, cycloalkyl, or cycloalkyl-alkyl, containing 6 to 18 carbon atoms, or wherein $R^1$ is $X^1$ as defined above, and $R^2$ has the formula $R^A$—$(OCH_2CH_2)_{0-12}$, $R^A$—C(O)NH—$CH_2CH_2$—$(OCH_2CH_2)_{0-6}$, or $R^A$—C(O)NH—(iso-$C_3H_6$)—$(OCH_2CH_2)_{0-6}$, wherein $R_A$ is straight or branched alkyl or alkenyl containing 8 to 20 carbon atoms and 0 to 3 carbon-carbon double bonds and is optionally substituted with hydroxyl; and mixtures thereof.

3. The method according to claim 1, wherein the fatty acid monoethanolamides have the formula RC(O)NH$CH_2CH_2$OH and the fatty acid diethanolamides have the formula RC(O)N($CH_2CH_2$OH)$_2$, wherein R is alkyl or alkenyl containing 8 to 18 carbon atoms and 0 to 3 carbon-carbon double bonds.

4. The method according to claim 1, wherein at least one sugar is selected from the group consisting of glucose, fructose, sucrose, sorbitol, mannitol, xylitol, and mixtures thereof.

5. The method according to claim 1, wherein the aqueous dispersion comprises:
   (a.1) 30 to 55 wt. % based on components (a.1), (a.2), (a.3), and (a.4) of at least one anionic surfactant,
   (a.2) 2 to 5 wt. % based on components (a.1), (a.2), (a.3), and (a.4) of at least one component selected from the group consisting of fatty acid monoethanolamides and fatty acid diethanolamides,
   (a.3) 1 to 3 wt. % based on components (a.1), (a.2), (a.3), and (a.4) of at least one alcohol containing 8 to 18 carbon atoms, and
   (a.4) 30 to 45 wt. % based on components (a.1), (a.2), (a.3), and (a.4) of at least two sugars, one sugar of which is maltodextrin which comprises 15 to 25 wt. % based on components (a.1), (a.2), (a.3), and (a.4).

6. The method according to claim 1, wherein the components (a.1), (a.2), (a.3), and (a.4) comprise 0.1 to 10 wt. % of the aqueous dispersion.

7. The method according to claim 2, wherein the components (a.1), (a.2), (a.3), and (a.4) comprise 0.1 to 10 wt. % of the aqueous dispersion.

8. The method according to claim 3, wherein the components (a.1), (a.2), (a.3), and (a.4) comprise 0.1 to 10 wt. % of the aqueous dispersion.

9. The method according to claim 4, wherein the components (a.1), (a.2), (a.3), and (a.4) comprise 0.1 to 10 wt. % of the aqueous dispersion.

10. The method according to claim 5, wherein the components (a.1), (a.2), (a.3), and (a.4) comprise 0.1 to 10 wt. % of the aqueous dispersion.

* * * * *